United States Patent [19]

Nykänen et al.

[11] Patent Number: 5,518,583
[45] Date of Patent: May 21, 1996

[54] ZERO DISCHARGE MILL DISTILLATION, SALT RECOVERY, AND WATER MANAGEMENT

[75] Inventors: Tuomo S. Nykänen; Brian F. Greenwood, both of Glens Falls, N.Y.; Johan Gullichsen, Helsinki, Finland; Erkki Kiiskilä, Karhula, Finland; Esko Mattelmäki, Varkaus, Finland; Joseph R. Phillips, Glens Falls, N.Y.; Jan T. Richardsen; Rolf Ryham, both of Roswell, Ga.; Jarmo Söderman, Helsinki, Finland; Karl G. Wiklund, Bonassund, Sweden

[73] Assignee: A. Ahlstrom Corporation, Noormarkku, Finland

[21] Appl. No.: 138,968

[22] Filed: Oct. 21, 1993

Related U.S. Application Data

[60] Division of Ser. No. 25,386, Mar. 2, 1993, Pat. No. 5,302,246, which is a continuation-in-part of Ser. No. 922,334, Jul. 30, 1992, Pat. No. 5,374,333.

[51] Int. Cl.[6] .................................................. D21C 11/00
[52] U.S. Cl. ...................... 162/29; 162/30.1; 162/30.11; 162/DIG. 8; 423/482; 423/552
[58] Field of Search .................... 162/29, 30.1, 30.11, 162/DIG. 8; 423/482, 552

[56] References Cited

U.S. PATENT DOCUMENTS

| | | | |
|---|---|---|---|
| 2,762,689 | 9/1956 | Giraitis et al. | 423/482 |
| 3,607,037 | 9/1971 | Terrana et al. | 23/178 |
| 4,039,372 | 8/1977 | Reeve et al. | 162/19 |
| 4,096,028 | 6/1978 | Rosenberger | 162/49 |
| 5,164,043 | 11/1992 | Griggs et al. | 162/57 |
| 5,277,759 | 1/1994 | Sannholm | 162/16 |
| 5,300,191 | 4/1994 | Lindberg | 162/31 |
| 5,382,322 | 1/1995 | Magnotta et al. | 162/30.11 |

FOREIGN PATENT DOCUMENTS

| | | |
|---|---|---|
| 989558 | 5/1976 | Canada. |
| 2041536 | 5/1991 | Canada. |
| 2159935 | 6/1973 | France. |

OTHER PUBLICATIONS

Rapson et al. "The Effluent–free Bleached Kraft Pulp Mill", Tappi, vol. 56, No. 9, Sep. 1973, pp. 112–115.
Bertel Myreen, "Closing Up the Bleach Plt . . . Effluent Incorporation", APPITA 1991, pp. 187–191.
Myréen, Bertel, "Closing up the bleach Plant", Jun. 1991.
Mannbro: "Closed–cycle recovery and Combustion of Bleachery Filtrate", *Nordic Pulp and Paper Research Journal* No. 3/1990, pp. 134–141.
International Search Report.

*Primary Examiner*—David L. Lacey
*Assistant Examiner*—Dean T. Nguyen
*Attorney, Agent, or Firm*—Nixon & Vanderhye

[57] ABSTRACT

In minimizing effluents from a cellulose pulp mill, liquid effluents from a bleach plant are concentrated, and then incinerated to produce a residue including sodium, sulfate, and sodium chloride. This residue is distilled with sulfuric acid to produce gaseous hydrogen chloride and remaining residue, the HCl being used in chloride dioxide production for the bleach plant, while the remaining residue is passed to the recovery loop (e.g. recovery boiler). Sulfur containing gases from the non-condensible gas system may be combusted to produce gaseous sulfur dioxide, which is then converted to sulfuric acid, to distill the residue. Where a non-chlorine bleach plant is provided, the liquid effluents may be concentrated in evaporators and then passed directly to the recovery boiler. The liquid streams in the mill are managed by a cascade principle to reserve the cleanest water for only those processes where it is needed while minimizing its use where it is not necessary.

17 Claims, 8 Drawing Sheets

5,518,583

ZERO DISCHARGE MILL DISTILLATION, SALT RECOVERY, AND WATER MANAGEMENT

CROSS REFERENCE TO RELATED APPLICATION

This application is a divsional of application Ser. No. 08/025,386, filed Mar. 2, 1993 now U.S. Pat No. 5,302,246, which in turn is a continuation-in-part of application Ser. No. 07/922,334 filed Jul. 30, 1992 (attorney reference 10-765) now U.S. Pat. No. 5,374,333.

BACKGROUND AND SUMMARY OF THE INVENTION

It has long been a desire of those working in the paper pulp art to produce a pulp mill that does not in any way significantly pollute the environment. A number of proposals have been made for such a pulp mill in the past, but the desired goal has yet to be achieved. For example, a "closed mill" was constructed at Great Lakes Forest Products, Thunder Bay, Ontario, in the 1970s, but it was difficult to run the mill closed for extended periods of time as a result of corrosion problems in the recovery boiler, and elsewhere, due to chloride buildup. See "Bleaching in the Closed Cycle Mill at Great Lakes Forest Products Ltd." by Pattyson et el, Pulp & Paper Canada, Vol. 82, No. 6, pp. 113–122 (1981). In the Great Lakes mill, bleaching plant effluents were introduced directly into the chemical recovery loop, as shown schematically in U.S. Pat. No. 4,039,372.

More recently, it has been proposed by HPD and Jaakko Poyry that closing of a pulp mill can be accomplished by evaporating acid effluent and then returning the $E_o$ bleach plant effluent to the brown stock washers. However that approach has yet to be successful, despite the utilization of plastic falling film evaporators which allow effective evaporation of the bleaching chemicals, and it is believed unlikely that it will ultimately be successful because of the buildup of undesired chemicals due to the introduction of the flow from the $E_o$ stage back to the brown stock washing stage.

According to the present invention, a method and apparatus are provided which utilize only existing technology, so that future development of sophisticated additional equipment or processes is not necessary, which essentially can reduce the liquid polluting effluents from a pulp mill to zero, provide only a minimum amount of solid waste for disposal (and provide the high probability that such solid waste can be used in an environmentally acceptable manner), and minimize the production of gaseous $NO_x$ and $SO_x$ products, so that the only significant gaseous pollutant from the pulp mill is carbon dioxide.

One of the basic aspects of the present invention that makes it possible to achieve these beneficial results is to treat the bleaching effluents completely separately from the chemical recovery loop until the effluents are in a particularly desirable form, and to then introduce the chemicals in that desirable form into the recovery loop. Another significant aspect of the present invention is the essentially complete oxidation of white liquor produced in the chemical recovery loop, which is then returned to the bleaching stage so that the proper balance between the various chemical treatment sequences is provided. Another significant aspect of the present invention that allows the desired results to be achieved are the production on site at the pulp mill, directly from the effluent streams and gaseous waste streams themselves, of essentially all of the sulfur dioxide, sulfuric acid, caustic or caustic substitute, and (if utilized) chlorine dioxide necessary to effect treatment of the pulp and recovery of the chemicals. Another factor which minimizes the amount of bleach plant effluents so as to make a proper treatment thereof practical, is advanced digesting techniques where delignification can be extended so that the pulp—without significant strength loss—discharged from the digesting stages has a low Kappa No. (e.g. 24 or below) and then the pulp is subjected to oxygen delignification to reduce the Kappa No. still further (e.g. to 14 or below, typically 10 or below) before bleaching is effected, allowing the production of prime market pulp (e.g. 88–90 ISO brightness).

The ability to produce prime market pulp with minimal adverse affect on the environment, according to the invention, is a quantum leap forward in pulping technology, and allows fulfillment of a long felt need to accomplish this desirable result.

According to one aspect of the present invention, a method of minimizing effluents from a cellulose pulp mill having a digester, bleach plant, and a recovery boiler and chemical recovery loop, is provided. The method comprises the following steps: (a) Concentrating (e.g. by evaporation) liquid effluents from the bleach plant to a concentration level high enough for incineration. (b) Incinerating the concentrated bleach plant effluents to produce a residue containing sodium, sulfate, carbonate, and sodium chloride. (c) Leaching the residue to produce a leachate. And, (d) feeding at least a substantial portion of the leachate to the chemical recovery loop associated with the recovery boiler.

The method also preferably comprises the further steps of: (e) Removing black liquor from the digester. (f) Increasing the solids concentration of the black liquor to a level high enough for incineration. (g) Incinerating the concentrated black liquor in the recovery boiler to produce a melt. (h) Producing white liquor and/or NaOH from materials in the recovery loop including the melt and the leachate fed to the recovery loop. (i) Oxidizing at least a part of the white liquor. And, (j) using at least a part of the oxidized white liquor in place of caustic in the bleach plant.

The invention also contemplates collecting spills of liquid from the pulp mill, evaporating the collected spills, and adding the concentrated spills to the concentrated bleach plant effluents in order to practice step (b). The spills are typically clarified before evaporation. There also are preferably the further steps of treating water removed from the bleach plant effluents by concentrating them, and then using the treated water as wash water in the bleach plant and in other mill processes.

Also there preferably are the further steps of producing substantially all caustic (or caustic substitute such as essentially completely oxidized white liquor) for the bleach plant, sulfuric acid, and sulfur dioxide needed for the plant processes, from process effluents and gaseous streams on site at the pulp mill so that no substantial external source of supply thereof need be provided.

Prior to feeding the leachate to the recovery loop, it is preferred that the leachate be crystallized and washed. The leachate also typically includes sodium chloride, and leachate containing chloride is used in the plant to produce substantially all of the chlorine dioxide necessary for the bleach plant. All of the metals above monovalent are removed from the leachate by washing, and those metals are kept out of the recovery loop and away from the bleach plant.

The bleach plant may have both acid and alkali liquid effluents, in which case it is desirable to initially evaporate (or otherwise concentrate) those different effluents separately, and then combine them for a final evaporation (concentration) before incineration. One typical bleaching sequence for the bleach plant may be $DE_oPD_nD$ (where $n$ refers to a neutralization stage between the two chlorine dioxide stages), and another typical bleaching sequence is $AZE_oPZP$, although a wide variety of other bleaching sequences may also be utilized.

The invention also contemplates a method of recovering chemicals from bleach plant liquid effluents resulting from the production of chemical cellulose pulp by the following steps: (a) Concentrating (e.g. evaporating) the bleach plant liquid effluents to produce a concentrated effluent. (b) Incinerating the concentrated effluent to produce a residue. (c) Acting on the residue to recover sodium, sulfate, carbonate and/or sodium chloride. And, (d) using the recovered sodium, NaCl, sulfate and/or carbonate in the production of the chemical cellulose pulp.

The invention also contemplates a method of producing cellulose chemical pulp in a pulp mill, which requires sulfur dioxide, sulfuric acid, and caustic, and which has process effluents and gaseous streams, comprising the step of producing all of the sulfuric acid, sulfur dioxide, and caustic (or caustic substitute) necessary to effectively produce chemical pulp directly at the pulp mill, from the process effluents and gas streams, so that substantially no additional sulfuric acid, sulfur dioxide, or caustic is necessary from external sources.

According to another aspect of the present invention, apparatus for producing chemical pulp with a minimum discharge of effluents is provided. The apparatus comprises: A digester. A chemical recovery loop operatively connected to the digester, and including a recovery boiler. A bleach plant including at least one liquid effluent line therefrom. Concentrating means (e.g. evaporators) connected to the liquid effluent line from the bleach plant to produce a concentrated effluent. An incinerator for incinerating the concentrated effluent from the evaporator means, for producing a residue. And, means for recovering sodium, NaCl, carbonate and/or sulfate from the incinerator residue and feeding at least some of those recovered materials to the recovery loop. Also, water is recovered from the bleach plant effluents, which is used elsewhere in the mill.

The evaporator means preferably comprise a plurality of stages of metal-plastic laminate, falling film evaporators. Such evaporators are available from A. Ahlstrom Corporation of Helsinki, Finland, and Ahlstrom Recovery Inc. of Roswell, Ga. under the trademark "Zedivap", and described in co-pending application Ser. No. 07/974,060 filed Nov. 12, 1992 (corresponding to Finnish Application 915424 filed Nov. 18, 1991, and the disclosure of which is incorporated by reference herein) now abandoned. Although other evaporators, such as desalination evaporators, also are feasible, the "Zedivap"™ evaporators are particularly advantageous and make the evaporating process for the bleach plant effluents practical. The evaporator means also may further comprise a concentrator between the stages of metal-plastic laminate evaporators and the incinerator.

According to yet another aspect of the present invention, the following apparatus is provided: A bleach plant for bleaching cellulose chemical pulp, and producing liquid effluents during bleaching. Means for concentrating (e.g. evaporating) the bleach plant liquid effluents to produce a concentrated effluent. An incinerator for incinerating the concentrated effluent to produce a residue. Means for acting on the residue to recover sodium, sulfate, NaCl, and/or carbonate. And, means for using the recovered sodium, sulfate, NaCl, and/or carbonate in the production of the chemical cellulose pulp being bleached.

The invention also contemplates the following apparatus: Means for acting upon all liquid effluents in the pulp mill so that no liquid effluents are discharged from the pulp mill to the environment. And, means for acting on all gaseous effluents from the pulp mill so that the amount of $SO_x$ and $No_x$ are minimized, and the only major adverse gaseous effluent is carbon dioxide.

According to still another aspect of the present invention there is provided the method of: Digesting comminuted cellulosic fibrous material to a Kappa No. of about 24 or below. Effecting oxygen delignification of the digested pulp to a Kappa No. of about 14 or below. Bleaching the oxygen delignified pulp to produce bleach liquid effluents. Concentrating (e.g. evaporating) the liquid bleach effluents into a concentrated effluent. Incinerating the concentrated effluent to produce a residue. And, acting on the residue to recover chemicals therefrom used in the digesting, oxygen delignification, and/or bleaching stages, while also recovering water.

As alternative to the procedures described above, in mills where a chemical plant for producing chlorine dioxide is provided for the bleach plant, the method of minimizing effluents may entail the following steps: (a) Concentrating liquid effluents from the bleach plant to a concentration level high enough for incineration. (b) Incinerating the concentrated bleach plant effluents to produce a residue containing sodium, sulfate, sodium chloride, and carbonate. (c) Distilling the residue from step (b) with sulfuric acid to produce gaseous hydrogen chloride, and remaining residue. (d) Using the gaseous hydrogen chloride from step (c) in the chemical plant for producing chlorine dioxide. And, (e) passing the remaining residue from step (c) to the recovery loop.

Preferably the recovery loop includes a recovery boiler, and step (e) is practiced to pass the remaining residue either directly to the recovery boiler, or first to evaporators and then to the recovery boiler. The remaining residue also may be treated to remove heavy and transition metals prior to the practice of step (e). Also the mill typically has a non-condensable gas system, including hydrogen sulfide and methyl mercaptan gases therein, and there are further steps of: (f) combusting the non-condensible gases in the non-condensible gas system to produce gaseous sulfur dioxide; (g) converting the gaseous sulfur dioxide to sulfuric acid; and (h) using the sulfuric acid from step (g) in step (c). Step (g) is preferably practiced by the Wet Sulfuric Acid (WSA) process. There may also be the further step (i), between steps (f) and (g), of reacting the gaseous sulfur dioxide from step (f) with sodium sulfite and water to produce concentrated sodium bisulfite and heating the concentrated sodium bisulfite in the presence of a catalyst to regenerate a concentrated form of gaseous sulfur dioxide; and wherein the concentrated form of gaseous sulfur dioxide from step (i) is used in step (g). Step (i) is known as the RESOX process.

Step (a) is typically practiced by evaporating the liquid effluents from the bleach plant, utilizing a plurality of stages of metal-plastic laminate falling film evaporators as described above.

Where the cellulose pulp mill bleach plant is a non-chlorine plant, a method of minimizing effluents may comprise the following steps: (a) Concentrating liquid effluents from the non-chlorine bleach plant, having little or no chlorine therein, to a concentration level high enough for combustion in the recovery boiler. (b) Passing the concentrated non-chlorine bleach plant effluents directly to the recovery boiler. And, (c) combusting the concentrated non-chlorine bleach plant effluents in the recovery boiler.

In all the procedures described, it is highly desirable to properly manage the water (liquid streams), so that the cleanest liquid is reserved only for those processes where it is needed, and so that its use is minimized where the absolutely cleanest water is not needed. Typically the pulp mill has at least first, second, and third loops of liquid streams, the loops having significantly different contamination levels, the contamination level gradually increasing from the first loop to the third loop. Minimizing the use of least contaminated liquid is achieved by: (a) sensing the contamination level in at least the first and second loops; (b) when the contamination level in the first loop exceeds a predetermined level, discharging some of the contaminated liquid from the first loop to the second loop, and replacing it with less contaminated liquid; (c) when the contamination level in the second loop exceeds a predetermined level, discharging some of the contaminated liquid from the second loop to the third loop, and replacing it with less contaminated liquid; and (d) purifying the most contaminated liquid from the loops to produce the less contaminated liquid for addition to at least step (b).

The method of managing liquid streams as described above is not limited to the methods heretofore described, but may be practiced in any pulp mill. Typically the method is practiced by combining the most contaminated liquid with the liquid effluents from the bleach plant to produce a combined effluent stream, and effecting evaporation of the combined effluent stream to produce a clean liquid and a more concentrated contaminant stream, with the clean liquid used as the less contaminated liquid in the steps described, while the more concentrated contaminant stream is further treated to recover contaminants therefrom (e.g. by incinerating and recovering chemicals from the incineration residue, etc., as earlier described). The pulp mill also typically includes a fourth loop and the contamination level in the third loop is sensed and when it exceeds a predetermined level some of the contaminated liquid is discharged from the third loop to the fourth loop, and replaced with less contaminated liquid. Also the contamination level in the fourth loop is preferably sensed, and when it exceeds a predetermined level liquid is discharged from it for the purification step earlier described. Liquid spills that are recovered from the pulp mill may be introduced into the fourth loop. There is also preferably the step of cooling the liquid in the loops, and in at least some of the loops separating contaminants from the loops and passing those separated contaminants to a more contaminated loop. Some of the contaminated liquid from the first loop may be passed directly to the third loop.

The invention also contemplates apparatus for managing liquid streams in a cellulose pulp mill having a digester, a bleach plant, and at least first, second, and third loops of liquid streams. The loops having liquid streams therein of significantly different contamination levels, the contamination level gradually increasing from the first loop to the third loop. This water managing apparatus comprises means for sensing the contamination level in at least the first and second loops; valve means controlled by the sensing means for discharging some of the contaminated liquid from one loop to another, more contaminated, loop; and means for purifying contaminated liquid (typically the most contaminated) from the loops to produce less contaminated liquid. The apparatus may also include means for cooling the liquid in each of the loops. Also, at least one of the loops includes means for separating a rejects stream from the loop, and for discharging the reject stream to another, more contaminated, loop.

It is the primary object of the present invention to provide for the production of cellulose chemical pulp with essentially zero discharge of liquid pollutants to the environment, with a minimum amount of gaseous pollution, and with the minimum amount of solid waste products. This and other objects of the invention will become clear from an inspection of the detailed description of the invention, and from the appended claims.

BRIEF DESCRIPTION OF THE DRAWINGS

FIGS. 3A–B are schematics of an alternative system according to the present invention based upon the same concepts as the systems of FIGS. 1 and 2A–B only showing different details of the handling of bleach plant effluents, the particular bleach plant stages involved, and the like;

DETAILED DESCRIPTION OF THE DRAWINGS

Figure 1:
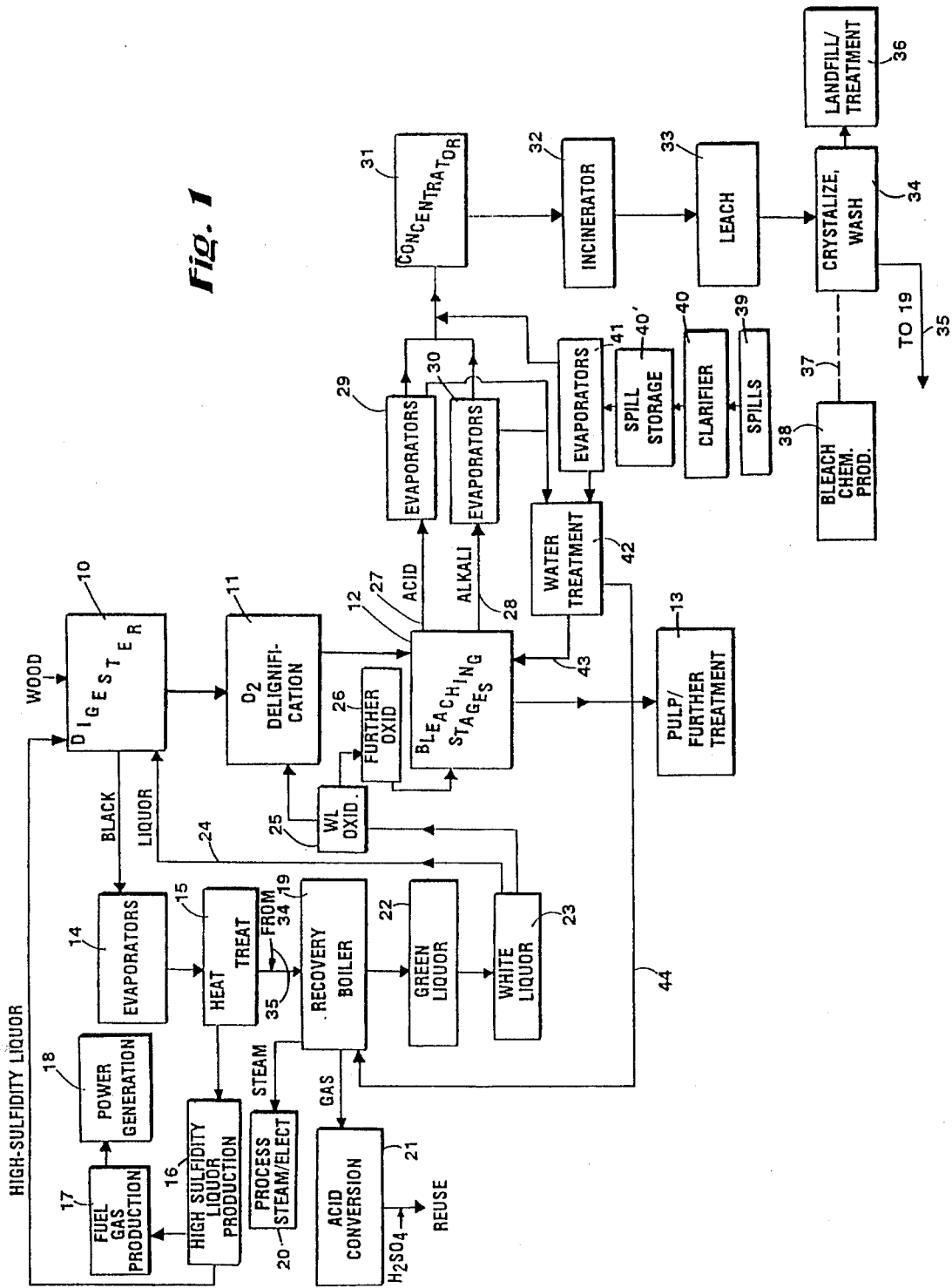
FIG. 1 is a schematic view of the most basic components of one exemplary system according to the present invention, and for practicing exemplary methods according to the present invention.

The exemplary system illustrated in FIG. 1 includes a conventional digester 10, such as a Kamyr® continuous digester, to which hard wood or soft wood chips, or other comminuted cellulosic material, is fed. In the digester 10 the wood chips are acted upon by the cooking chemicals at conventional temperature and pressure conditions so as to produce chemical cellulose pulp, such as kraft pulp, which then is preferably subjected to oxygen delignification at stage 11. According to the present invention it is desirable to delignify the pulp so that it has a minimum Kappa No. when discharged from the digester 10, such as by using a Kamyr EMCC® digester and process, which produces a Kappa No. of about 24 or below. The oxygen delignification stage 11 reduces the Kappa No. to about 14 or below, preferably to about 10 or below.

After oxygen delignification, the pulp proceeds to the bleach plant 12 where it is subjected to bleaching in a plurality of different bleaching stages. The particular bleaching stages that are utilized can be varied, and are also dependent upon the particular cellulose material being treated. After the bleaching stages 12, the pulp may proceed on to storage or further treatment stages 13. For example the pulp may be dried and then shipped to a paper mill.

As is conventional, black liquor is withdrawn from the, digester 10 (or brown stock washer associated therewith), and is passed to evaporators 14. The black liquor also is preferably subjected to heat treatment such as shown in U.S. Pat. No. 4,929,307 (the disclosure of which is hereby incorporated by reference herein). Sulfur containing gases driven off by the heat treatment 15 may be handled as shown in co-pending application Ser. No. 07/788,151 filed Nov. 5, 1991 now abandoned, for example to produce high sulfidity liquor at stage 16, where the production of fuel gas (e.g. primarily methane) as indicated schematically at 17, makes possible generation of power as indicated generally at 18.

After treatment at stage 15 the black liquor is ultimately passed (there may be intervening evaporation stages if desired) to a conventional recovery boiler 19. Steam produced from the recovery boiler 19, as indicated generally at 20 in FIG. 1, is used for various processes within the pulp mill. The gases discharged from the recovery boiler 19 include sulfur dioxide which can be used as the feed material for the production of sulfuric acid according to conventional techniques. As indicated at 21 in FIG. 1, sulfur dioxide and sulfuric acid (produced from the $SO_2$) can be used wherever necessary in the mill. For example the sulfur dioxide is used as an anti-chlor for the last stage of chlorine dioxide bleaching (if utilized), and for the tall oil plant. According to the invention, sufficient sulfur dioxide and sulfuric acid are available from block 21 to fulfill the needs of the pulp mill without requiring those chemicals from an external source. While of course one cannot expect the chemical recoveries and consumptions to balance exactly, according to the invention they may be expected to be within a few percent of each other. Of course any small amount of excess chemical can be sold, and any deficiency made up by purchase.

The melt from the recovery boiler 19, as is conventional, is used to form green liquor as indicated by reference numeral 22 in FIG. 1, and the green liquor is then preferably ultimately used to make white liquor, as indicated generally by reference numeral 23 in FIG. 1. Alternatively, or in addition, the green liquor may be crystallized and otherwise acted upon to produce essentially sulfur free sodium hydroxide, as disclosed in co-pending application Ser. No. 07/918, 855 filed Jul. 27, 1992 (attorney docket 30-199), the disclosure of which is incorporated by reference herein.

The sulfur content of the melt may be adjusted by bringing a portion of the melt discharged from the recovery boiler 19 into contact with a sulphurous gas of the pulp mill. Also, one can thermally split the methyl mercaptan and dimethyl sulphide of the sulphurous gas into ethane and hydrogen sulphide before it is brought into contact with the melt, or into contact with ash from the recovery boiler 19. Any white liquor produced from this melt will have controlled and/or enhanced sulfidity. These techniques are disclosed in Finnish Applications 914585 and 914586, both filed Sep. 27, 1991.

Some of the white liquor is fed via line 24 back to the digester 10, and according to the present invention, in order to balance the chemical flows, it is highly desirable that a portion of the white liquor from 23 be oxidized at stage 25 in a conventional or known manner, and then used in the oxygen delignification stage 11. One known manner of oxidation termed "bubbleless membrane aeration" is described in an article by Michael Semmens in the April, 1991 edition of "WATER/Engineering & Management", pp 18 & 19. Also, a portion of the oxidized white liquor from 25 is preferably subjected to a second oxidation stage 26—such as shown in co-pending application Ser. No. 07/910,874, filed Jul. 9, 1992 now abandoned (the disclosure of which is hereby incorporated by reference herein)— in order to oxidize all of the sulfur forms within the white liquor to sulfates. The resulting essentially completely oxidized white liquor is then returned to the bleaching plant 12 and used in place of caustic in the bleach plant 12. Sufficient oxidized white liquor can be produced in 26 according to the invention so that all of the caustic needs for the bleach plant 12 are taken care of, without the necessity of requiring caustic from an external source.

Also according to the present invention, the liquid effluents from the bleach plant 12—such as the acid effluent in line 27 from the first bleaching stage, and the alkali effluent in line 28 from the second bleaching stage—are concentrated, e.g. by passage to evaporator stages 29, 30, respectively. The evaporators which comprise the stages 29, 30 preferably are low cost metal-plastic laminate, falling film evaporators, such as sold by A. Ahlstrom Corporation of Helsinki, Finland and Ahlstrom Recovery Inc. under the trademark "Zedivap". Such laminates are typically of aluminum (or brass or copper) and plastic (e.g. polyethylene, polypropylene, or polyester), each layer having a thickness of less than 100 μm. For example an aluminum layer may be 9–18 μm thick, and a polyester layer 12–25 μm thick. A plastic film may be extruded on a metal foil to produce a laminate. A heat exchanger is formed by attaching two rectangular laminated strips to each other, for example by a glued joint. The laminated strips may also be connected to each other by dot-like junction points between the joints at the edges. The pulp mill liquids may flow down the plastic layer, or the metal layer. Such an evaporator surface is disclosed in co-pending application Ser. No. 07/974,060 filed Nov. 12, 1992 now abandoned (corresponding to Finnish Application 915424 filed Nov. 18, 1991, and the disclosure of which is incorporated by reference herein). However, conventional desalination evaporators may be used instead.

Where both acid and alkali liquid effluent lines 27, 28 are provided, it is desirable not to mix them until the effluents have been concentrated in the evaporators 29, 30 otherwise a severe foaming problem may ensue. If the foaming problem can be overcome, then the lines 27, 28 may be combined before the evaporators 29, 30.

After the stages 29, 30, the more concentrated effluent passes to the concentrator 31, which comprises a series of high-efficiency evaporator stages which concentrate the effluent to a sufficient level so that it can be incinerated. For example, the concentration of the effluent in lines 27 and 28 may be 0.2–0.5% solids, which is concentrated to a solids content of about 10–30% by the evaporators 29, 30, and then concentrated to a concentration of about 50–60% by the concentrator 31.

Concentration of the bleach plant effluents may be accomplished by other techniques aside from evaporation. For example, conventional ultra-filtration, reverse osmosis, freeze crystallization, or a combination of these techniques with each other and/or with evaporation, may be utilized to produce effluent with a sufficiently high concentration.

The concentrated effluent from the concentrator 31 or the like is fed to an incinerator 32 where it is burned to produce a residue. Incineration may be practiced according to a number of conventional or known techniques, such as slagging combustion or gasification (as by means of a circulating fluidized bed gasifier).

Valuable chemical components of the residue from incinerator 32 are ultimately returned to the recovery loop (i.e. components 14, 15, 19, 22, 23, etc.). In order to effectively return valuable components of the residue, such as sodium, sulfate, and carbonate, the residue is preferably leached by a conventional leaching apparatus, as indicated at 33 in FIG. 1. Preferably, the leachate from the leaching stage 33 is crystallized (e.g. freeze crystallized; see U.S. Pat. Nos. 4,420,318, 4,505,728, and 4,654,064) and washed as indicated at 34. Leaching and crystallizing per se (although in a recovery loop) are known as indicated by TAPPI Journal Volume 66, No. 7, July, 1983 "Recovering Chemicals in a Closed Sulfite Mill" by Davies et al.

The crystallized and washed leachate from stage 34 (or at least a portion thereof) is fed—via line 35—to the recovery loop, such as just before the recovery boiler 19. In that way the valuable chemicals from the bleach plant effluent in lines 27, 28 are returned to the recovery loop. The washing separates out metals above monovalent, such as calcium and magnesium, which may be land-filled or treated—as indicated at 36 in FIG. 1. The solid material at 36 is essentially the only solid waste material from the pulp mill of FIG. 1, and only comprises about 5% of the chemicals from the residue of incinerator 32, the other 95% being used elsewhere (e.g. in the recovery loop).

The residue from the incinerator 32 also typically includes sodium chloride, and the chlorine content thereof can be used—as indicated by dotted line 37 and box 38 in FIG. 1—to produce chlorine dioxide and sodium chloride. In this circumstance, some of the leachate from stage 34 flows to the chlorine dioxide production stage 38, while the rest is returned to the recovery loop via line 35.

In many pulp mills, regardless of age, the amount of spill liquid can be a significant percentage of the total liquid effluents. Spill liquids as high as 33% of a mill total liquid effluents (including the bleach plant liquid effluents in lines 27, 28) are not unusual. Of course if such spills are allowed to leak into the environment, then the goal of a low or zero discharge mill will not be realized. Therefore according to the present invention, the liquid spills—preferably from the entire pulp mill—are collected utilizing conventional drainage and collection systems, as indicated schematically at 39 in FIG. 1. Those spills are then clarified in the clarifier 40, and passed to spill storage 40' and then to the evaporator stages 41. The evaporators in stages 41 are preferably Zedivap™ evaporators. The concentrated spills from the evaporators 41 are then combined with the concentrated effluents from evaporators 29 and 30, and passed to concentrator 31.

Of course all of the evaporator stages 29, 30, and 41 will produce water, which has been removed from the bleach plants effluents during the concentrating action thereof. The water from each of the evaporator stages 29, 30, and 41 is passed to a water treatment facility 42 which treats it so that it does not have any components which are harmful if the water is used for other purposes. This "recovery" of water is also a big advantage of the method and apparatus according to the invention. Part of the water is then returned, via line 43, to the bleach plant 12 to serve as wash liquid flowing countercurrently to the pulp from one stage to another in the bleach plant 12, while another part of the water passes in line 44, which goes to the recovery boiler 19 as feed water, for the production of process steam at 20.

Figure 2A:
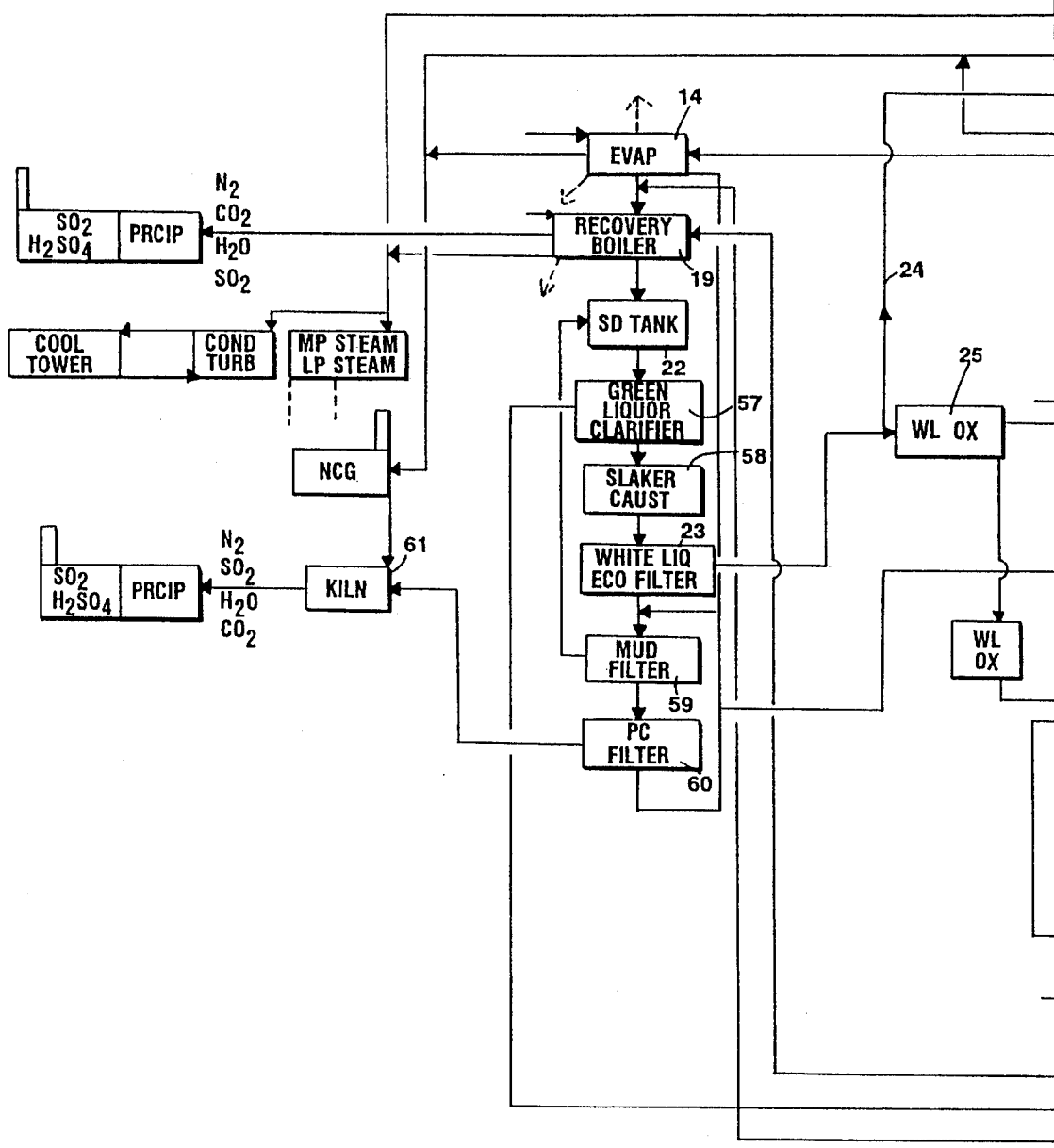
FIGS. 2A–B are flow sheets similar to that of FIG. 1, only showing a number of the particular processes involved in more detail.
Figure 2B:
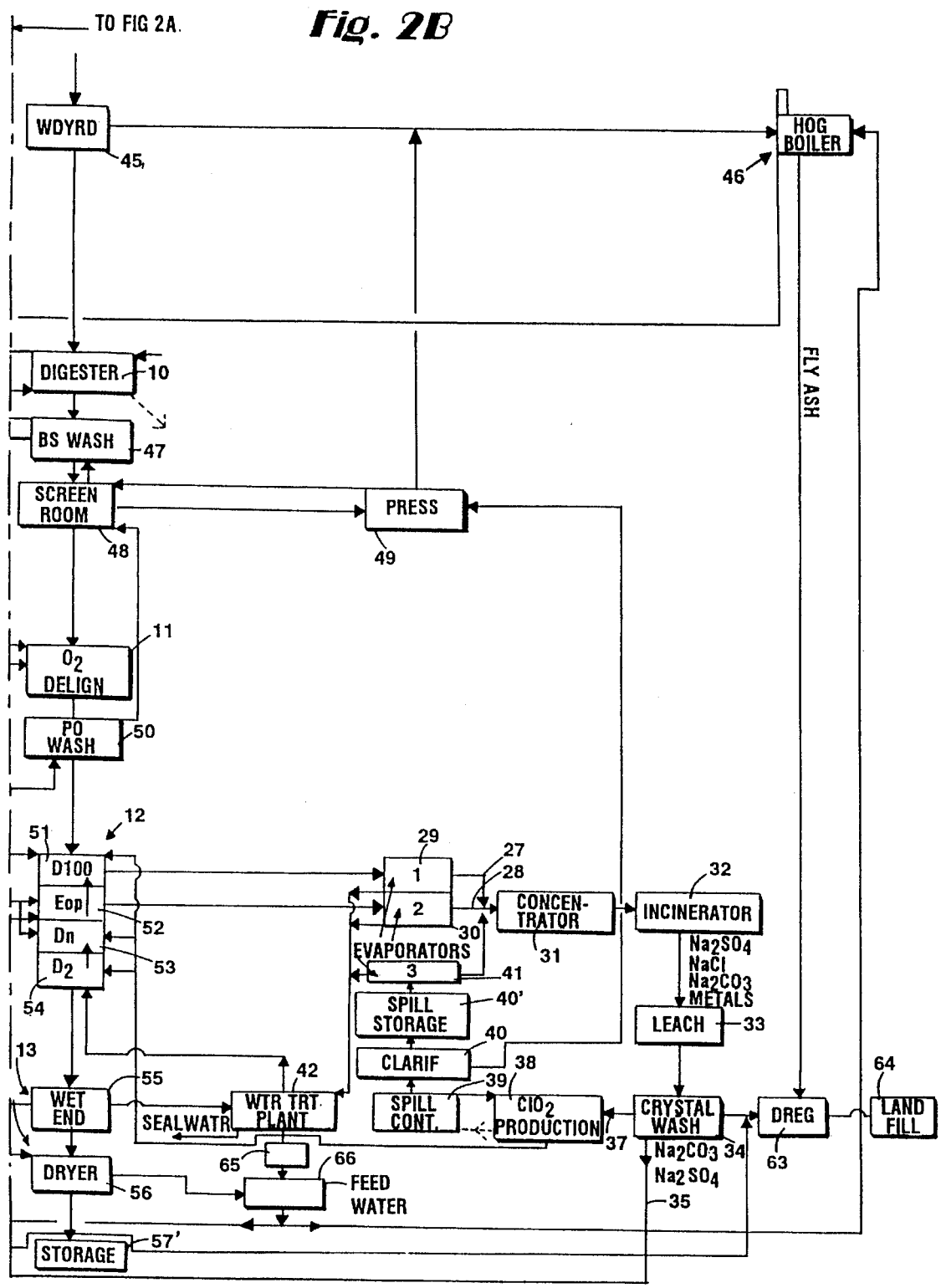

FIGS. 2A–B provide an illustration of the same basic system, for practicing the same basic method, as in FIG. 1, only shows a number of the components in more detail. In the illustration of FIGS. 2A–B components comparable to those in FIG. 1 are shown by the same reference numeral.

In the illustration in FIGS. 2A–B, a wood yard 45 is shown connected to the digester 10, and also to a conventional hog fuel boiler 46. A brown stock washing stage 47 is disclosed after the digester 10, as well as a screen room 48 cooperating with a press 49, the press 49 also connected to the clarifier 40. Downstream of the oxygen delignification stage 11 is a further washing stage 50, which is then connected to the first stage 51 of the bleach plant 12. In the embodiment illustrated in FIGS. 2A–B, the first bleaching stage 51 is a 100% chlorine dioxide stage. The second stage 52 is an $E_{op}$ stage, a source of caustic being provided by the oxidized white liquor from 26. A third bleach stage 53 is a neutral chlorine dioxide stage. That is a portion of the oxidized white liquor from source 26 (or caustic) is added to the top of the tower of stage 53 in order to neutralize the pulp acidity. The fourth stage 54 is a last chlorine dioxide stage. Chlorine dioxide from the production stage 38 is fed to each of the stages 51, 53, and 54, while a portion of the wash water from the water treatment plant 42 enters the fourth stage 54.

The further treatment stages 13 in the FIGS. 2A–B illustration include the "wet end" 55 and dryer 56, which may be connected to a storage facility 57'.

As part of the recovery system, other conventional components are illustrated in FIGS. 2A–B, such as the green liquor clarifier 57, the slaker 58 for causticizing the green liquor, and the lime mud handling components including the mud filter 59, pre-coat filter 60, lime kiln 61, etc.

Associated with the components acting upon the bleach plant effluents is the dregs stage 63, which may be supplied with the higher than monovalent metals from the crystallizing and wash stage 34, as well as fly ash from the hog fuel boiler 46. The materials from the dreg stage 63 may be passed to a land-fill 64, or treated to recover the chemicals therefrom, or the chemicals therein can be utilized in an environmentally acceptable manner.

Also illustrated in FIGS. 2A–B is an optional ozone treatment stage 65 for treating water from the water treatment plant 42. The water from plant 42 is ozonated before flowing to the feed water source 66 which supplies the recovery boiler 19, and which also receives water from the dryer 56. Water from the wet end 55 may pass to the water treatment plant 42, or to the interface between the second and third bleaching stages 52, 53.

Figure 3A:
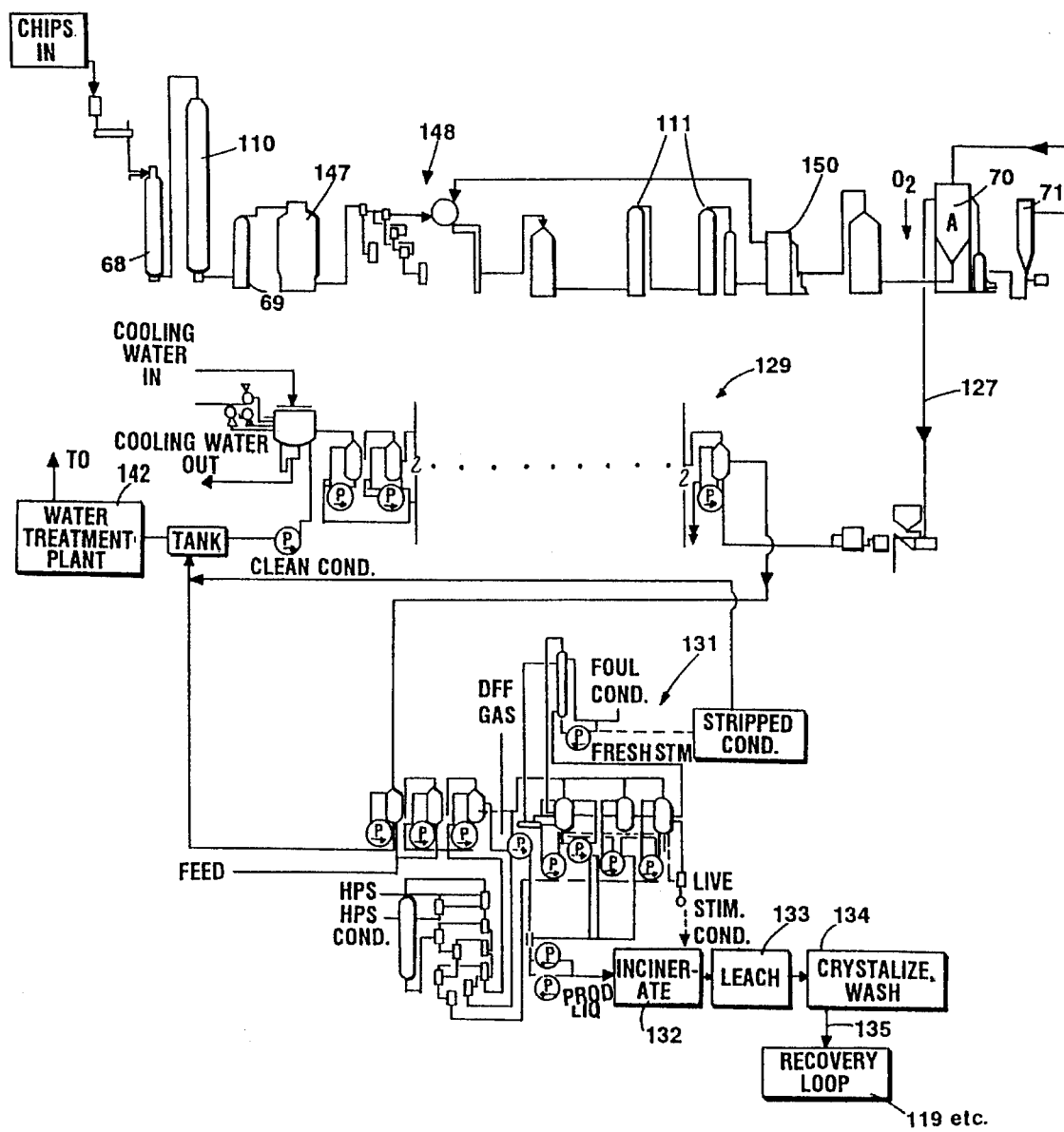
Figure 3B:
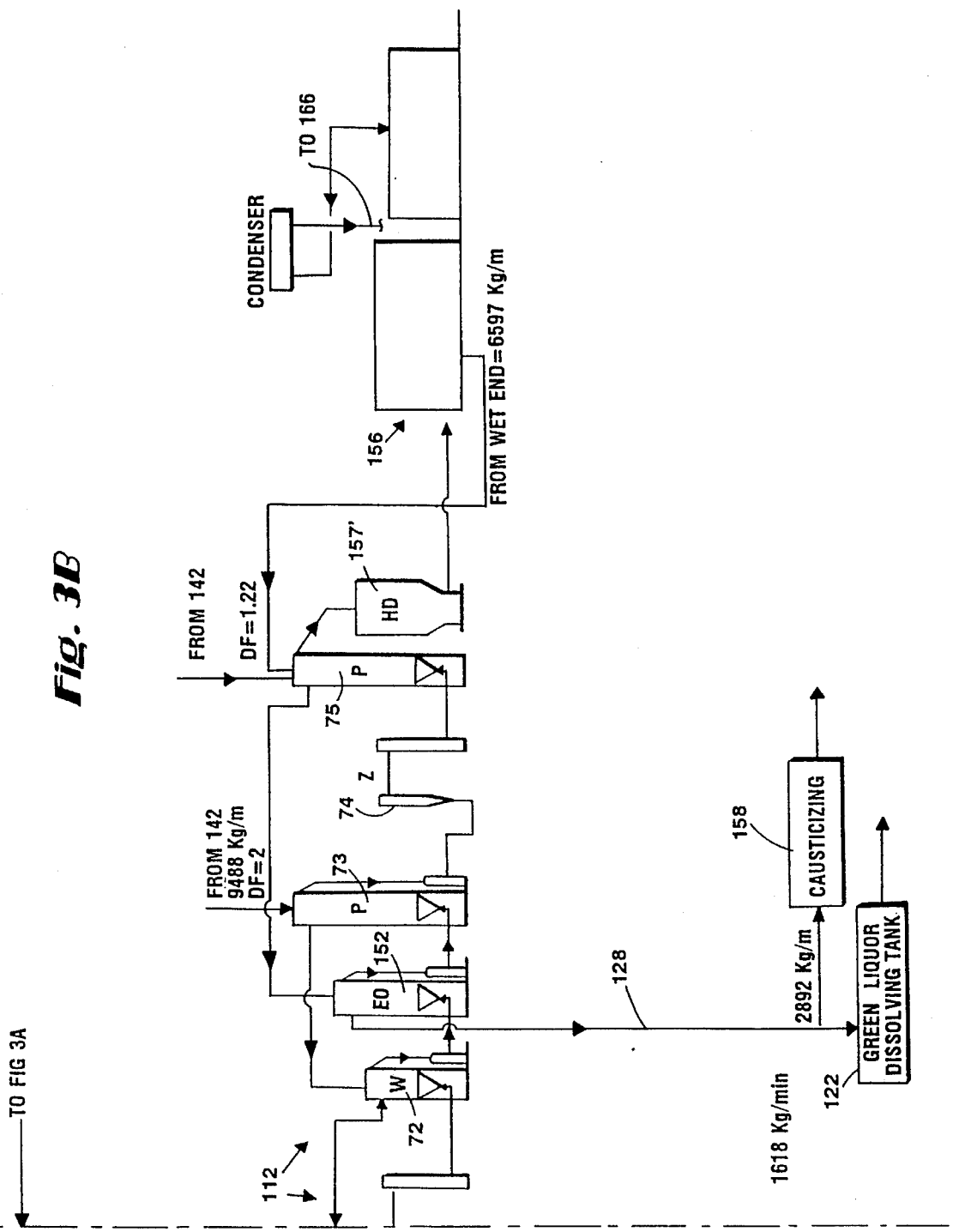

FIGS. 3A–B illustrate another alternative system according to the present invention. One of the major differences between the system of FIGS. 3A–B and that of FIGS. 1 and 2A–B is in the particular bleach sequence which is provided, namely an $AZE_oPZP$ bleach sequence. In FIGS. 3A–B components comparable to those in the FIGS. 1 and 2A–B embodiments are shown by the same reference numeral only preceded by a "1". Also FIGS. 3A–B schematically illustrate a number of the components used in the system rather than merely showing them in block diagram, as in FIGS. 1 and 2A–B.

The digester 110 may be part of a two vessel hydraulic system, including an impregnation vessel 68, such as an EMCC® digester sold by Kamyr, Inc. of Glens Falls, N.Y. A pressure diffuser, 69, or similar brown stock washer may be downstream of the digester 110, which in turn is connected to high-density storage tank, 147, and then the brown stock screen room 148. The oxygen delignification reactors 111 are connected to the post oxygen washing stage 150, which is then connected to the first bleach stage 70, in this case an acid, "A", stage. The second stage of the bleach plant 112 is the first ozone stage 71, and after a wash 72 the $E_o$ stage 152 is provided. Following the $E_o$ stage 152 is a first peroxide stage 73, then the second ozone stage 74, and the second peroxide stage 75, connected up to the high density storage tank 157'.

In the embodiment of FIGS. 3A–B, the acid bleach plant effluent line 127 is connected to the Zedivap™ evaporator stages 129, just like in the FIGS. 1 and 2 embodiment, which in turn are connected to the concentrator 131, incinerator 132, leach stage 133, and crystallizing and wash stage 134. However the alkaline effluent line 128 is not connected up to evaporators, but instead is connected up to the recovery loop, typically to the green liquor dissolving tank 122. Also a part of the alkali effluent in line 128 may be used for causticizing, e.g. connected to stage 158; however, much of the alkali effluent would be added to the post-oxygen washing stage.

The pulp mills of FIGS. 1 through 3B, in addition to producing essentially zero liquid effluent discharges, produce little air pollution. Sulfur dioxide and other sulfur compounds are recovered from the recovery boilers 19, 119 stacks, and electrostatic precipitators are also provided in the stacks. Also, the recovery boilers 19, 119 and all the other components, such as incinerators 32, 132, are operated so as to have minimal $NO_x$ discharge. The major gaseous pollutant, then, from the pulp mill will only be carbon dioxide.

Figure 4:
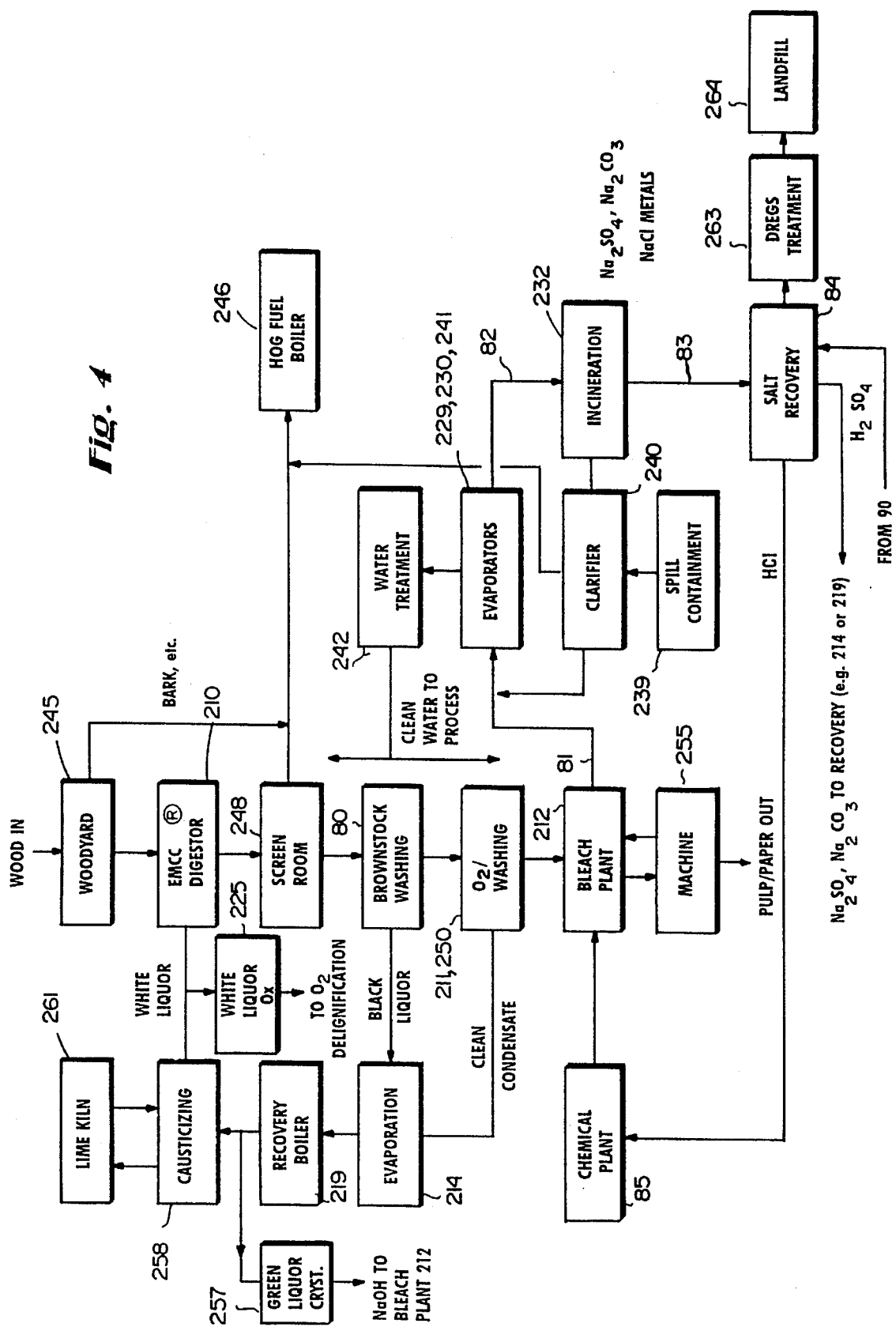
FIG. 4 is a view like that of FIG. 2A–B, only simplified, and showing alternative exemplary treatment of concentrated liquid effluents from the bleach plant, according to another aspect of the present invention.

FIG. 4 schematically illustrates a system like that of FIGS. 2A and 2B, only in simplified form, and showing an alternative technique for handling the concentrated liquids from bleach plant effluent evaporation. In the FIG. 4 embodiment components comparable to those in the FIGS. 2A and 2B embodiment are shown by the same two digit reference numeral only preceded by a "2". Most of the components will not be described in detail since they have already been described with respect to the FIGS. 1 and 2 embodiment.

In the FIG. 4 embodiment, the bleach plant 212 is one that includes at least one stage in which chlorine dioxide is used as a bleaching chemical. The effluents from bleach plant 212 pass in line 81 to the evaporators 229, 230, 241 (which may be a single series of metal-plastic laminate evaporators, with a plurality of stages), and the concentrated effluents pass in line 82 to the incinerator 232. Incinerating the concentrated bleach plant effluents produces a residue containing sodium, sulfate, sodium chloride, and carbonate, as well as heavy and transition metals. The sodium, sulfate, and carbonate are typically in the form $Na_2SO_4$ and $Na_2CO_3$. The residue passes in line 83 to salt recovery stage 84.

In the salt recovery stage 84, the residue is distilled with sulfuric acid (from any source; however one preferred source will be described with respect to FIG. 6) to produce gaseous hydrogen chloride (HCl), and remaining residue. The distillation reaction also produces sodium sulfate as a precipitate when the sodium chloride reacts with the sulfuric acid.

The gaseous HCl from salt recovery stage 84 is an ideal chemical to be used in the chemical plant 85 to produce chlorine dioxide. Manufacture of chlorine dioxide in chemical plant 85 is as conventional, and the plant 85 is capable of manufacturing sufficient chlorine dioxide to satisfy the needs of the bleach plant 212 without any significant supplementation.

The sodium sulfate that precipitates in the salt recovery station 84 is combined with the remaining residue and is ultimately directed to recovery. Within the salt recovery stage 84 there preferably is conventional treatment to remove heavy and transition metals in the form of metal hydroxides, which metal hydroxides pass to the dregs treatment stage 263. The sodium sulfate and sodium carbonate in the remaining residue, after metals removal, then passes to the recovery loop, for example first to evaporation stage 214 if in slurry form and a higher concentration is necessary, or directly to the recovery boiler 219.

Figure 5:
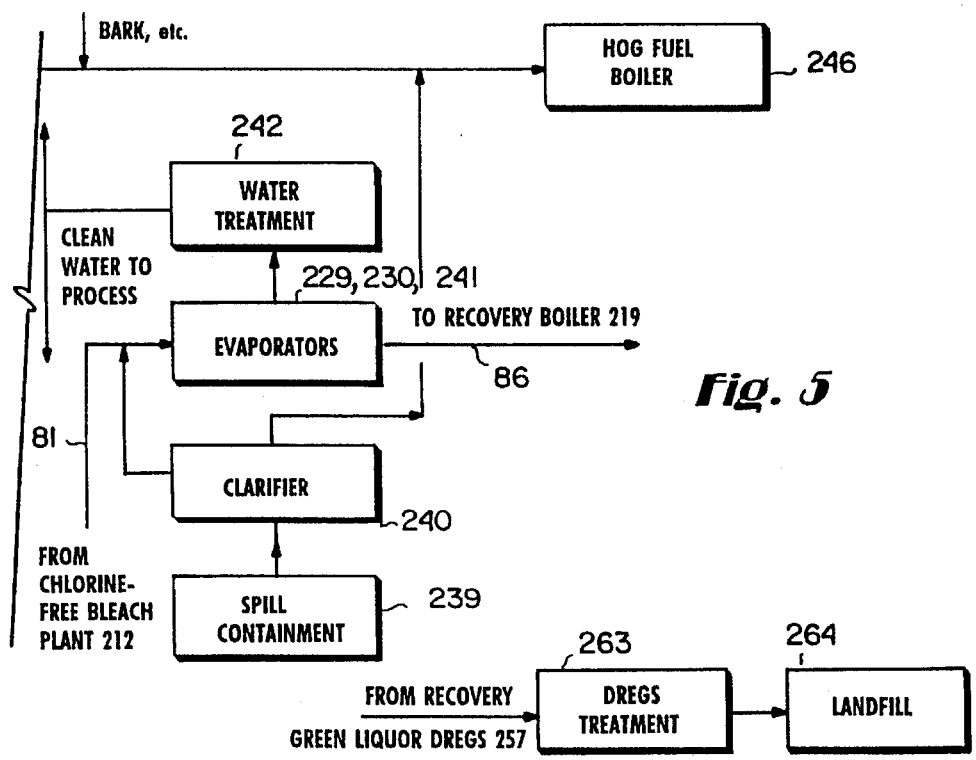
FIG. 5 is a schematic view like that of FIG. 4 only showing yet another modification of treatment of the bleach plant effluents, when the bleach plant is a chlorine-free bleach plant.

Another alternative treatment for the bleach plant effluents is illustrated in FIG. 5. In FIG. 5 components comparable to those in FIG. 4 are shown by the same reference numeral. In this embodiment the bleach plant (212) is a non-chlorine bleach plant (such as one using Z, P, and E stages), and the liquid effluents discharged therefrom in line 81—once concentrated in evaporators 229, 230, 241—may pass in line 86 directly to the recovery boiler (219), there being no necessity of further treatment thereof. There is little or no chlorine in such effluents, and thus once they are concentrated enough they may be combusted directly in the recovery boiler 212.

Figure 6:
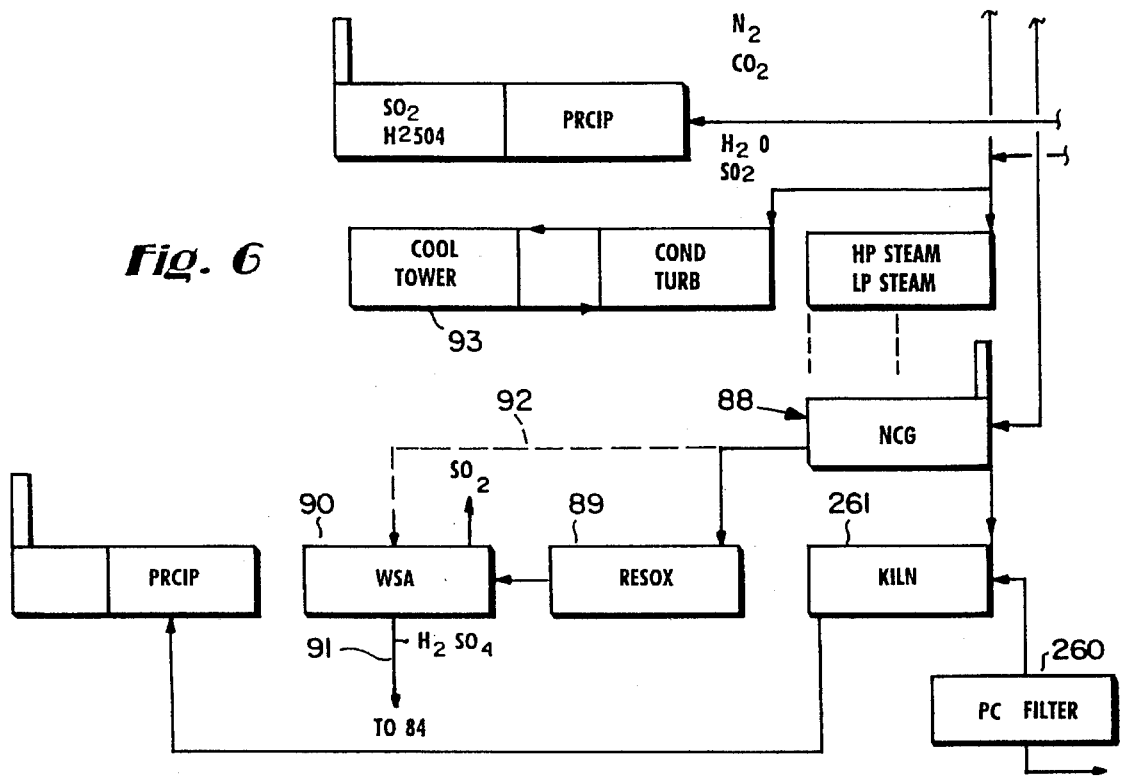
FIG. 6 is a schematic view of a portion of the system of FIG. 2A only showing modified treatment of gases, including for the production of sulfuric acid.

FIG. 6 schematically shows treatment of non-condensible gases which have been collected at the pulp mill and which are utilized to produce the sulfuric acid that is used in the salt recovery stage 84 of FIG. 4. In FIG. 6 components comparable to those in the FIG. 2A embodiment are shown by the same reference numeral only preceded by a "2".

In FIG. 6 the NCG stage 88 is a conventional non-condensible gas system, which is utilized to collect hydrogen sulfide, methyl mercaptan, dimethyl sulfide, and other sulfur containing gases which are the source of the malodorous gas emissions associated with old style kraft pulp mills. These gases may emanate from the digester, washers, evaporators, recovery furnace, lime kiln 261, or elsewhere.

According to the present invention, one stream of non-condensible gases from stage 88 may be passed directly to lime kiln 261, where they are combusted to produce off-gases containing sulfur dioxide, which are treated conventionally (in "PRCIP" in FIG. 6). A second stream may be passed to the RESOX stage 89. The RESOX stage 89 uses the RESOX process marketed by A. Ahlstrom Corporation of Helsinki, Finland. In this commercial process, the NCG gases (hydrogen sulfide, MM, DMS, etc.) enter a scrubber where the hydrogen sulfide is absorbed into while liquor in a conventional scrubber or absorption tower. The increased sulfidity white liquor is used in pulping. The non-absorbed gases are condensed in a cooling condenser, resulting in removal of the moisture and liquefication of the gases. They are then incinerated to produce hydrogen sulfur dioxide, water, and carbon dioxide gases. This gaseous mixture is scrubbed with a caustic soda and sodium sulfite solution in a conventional scrubber or absorption tower in which the sulfur dioxide reacts with the sodium sulfite to produce sodium bisulfite. The bisulfite and water are then heated in an evaporator to produce sulfur dioxide and water off gases and an aqueous sodium sulfite solution. The sulfite is recycled back to the caustic stream in the scrubber, and as a source of pulping chemical.

The sulfur dioxide and water off gases from stage 89 may also then pass to WSA stage 90, where they are then condensed to yield streams of water and sulfur dioxide; some of the sulfur dioxide can be made available for mill purposes. The rest of the sulfur dioxide and water off gases in stage 90 are converted to sulfuric acid ($H_2SO_4$), which passes in line 91 to salt recovery stage 84.

The WSA stage 90 thus practices the WSA process, a process marketed by Haldor Topsoe A/S of Lyngby, Denmark. This process is described in an article entitled "Production of Sulfuric Acid from Sulfurous Off-Gases by the Topsoe WSA-2 Process" written by Bendixen and Schouby and presented at "Sulfur 87" in Houston, Tex., 1987 (which article is incorporated by reference herein).

While it is preferred that the WSA stage 90 use the concentrated gaseous sulfur dioxide gas from the RESOX stage 89, if the WSA stage has a combustion unit in which sulfur dioxide is produced, gas in dotted line 92 of FIG. 6 passes from NCG unit 88 directly to the WSA stage 90, when stage 89 is not in use, or eliminated.

Figure 7:
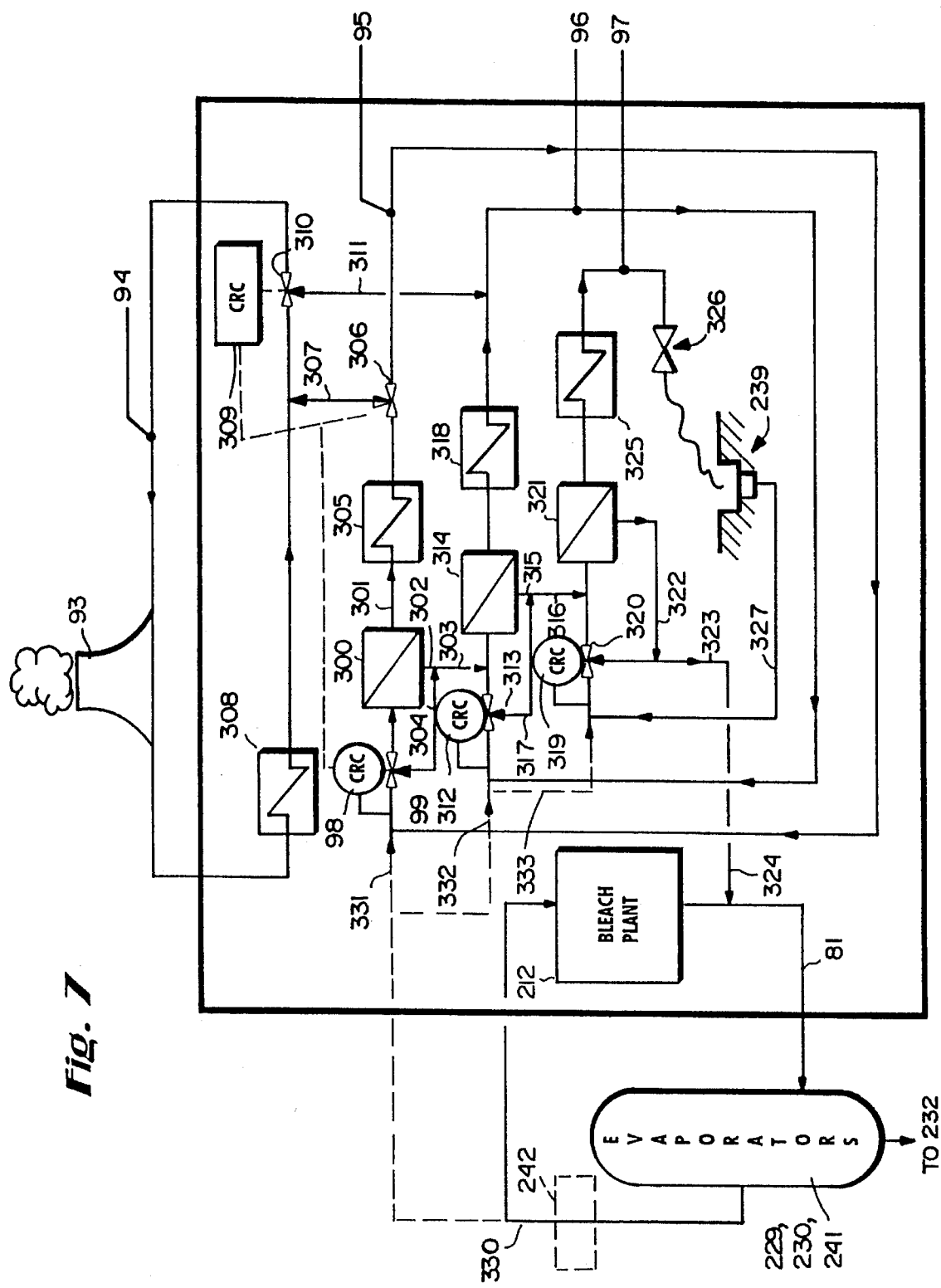
FIG. 7 is a schematic view showing exemplary apparatus according to the invention for practicing an exemplary method according to the invention for managing water (liquid) streams in a pulp mill to reserve the cleanest liquid for only those processes where it is needed, while minimizing its use where it is not needed, and thus optimizing the chances of achieving the goal of "zero discharge".

An important aspect of being able to maximize the probability of zero discharge from the mill is to properly manage the water (liquid) streams that are present in a pulp mill. If the cleanest water is used only for those processes where it is needed, while its use is minimized where it is not needed, then the probability of being able to achieve "zero discharge" is enhanced. FIG. 7 shows a cascading water management system, for practicing a water management method, according to the cascade principle, of the invention which reserves the cleanest water for those processes where it is needed while minimizing its use where it is not necessary. Structures in this embodiment comparable to those in the FIG. 4 embodiment are shown by the same reference numeral. Structures not heretofore illustrated are shown by two digit reference numerals starting with "94", or with three digit reference numerals starting with "3".

In the exemplary embodiment illustrated in FIG. 7, a cooling water loop 94, connected to the cooling tower 93 (see FIG. 6 too) is one of the mill main loops. The first loop in the mill, 95, is the seal water loop (circuit) 95, which is operatively connected to the second, cooling water, loop 94, to a third, fairly contaminated, loop 96, and to a—in this embodiment—fourth "most" contaminated loop 97, which can include the spills recovery system 239 for the entire mill therein. From the first through fourth loops, the water (liquid) within the loop will have gradually increasing, significantly different, contamination levels, the first, seal, loop 95 being the least contaminated, and the fourth loop 97 being the most contaminated.

Associated with each of the loops 94–97 is a contamination monitoring means, typically a conductivity recorder/controller/probe (commonly known as a CRC). For example a CRC 98 is associated with the three-way valve 99 in the first loop 95. One exemplary form of such a probe is Model 461 available from TBI of Carson City, Nev. (described generally in U.S. Pat. No. 4,118,663), and it is connected to a conventional controller (computer) to effect control in response to conductivity measurements. The CRC 98 monitors the contamination of the liquid flowing in the loop or circuit 95, and when it becomes higher than a predetermined level, it is vented to one or more more contaminated loops.

The loop 95 typically also includes a separation device 300 which may separate dry solids, metals, salts, fibers, or dirt from the water circuit 95 (or other loop in which it is placed). The device 300 may employ ultra-filtration, reverse osmosis, membrane filtration, or fiber filter techniques, depending upon the mill and the particular location in the loop 95. The device 300 has an "accept" line 301, and a "reject" line 302, extending therefrom. The line 302 is connected to a vent line 304 from the valve 99, to form a main line 303 which—in this case—feeds into the third loop 96. The lesser contaminated water from the separation device 300 passes in line 301 to the cooler 305 where its temperature is reduced by heat exchange with the surrounding environment, or other cooling source, and then passes to a further three-way valve 306. The valve 306 is also controlled by the CRC 98 so that if the contamination level is too high in the first loop 95, some of the contaminated liquid can be discharged through valve 306 into line 307, to the second, cooling water, loop 94. The discharge through line 307 may take place in addition to, or instead of, the discharge from valve 99 in line 304.

The cooling water loop 94 typically also includes a cooling heat exchanger 308, as well as a CRC 309 for controlling the three-way valve 310, having a discharge conduit 311. The CRC 309 monitors the contamination level of the water in loop 94, and if it becomes greater than desired, valve 310 is controlled to discharge some of the contaminated liquid through line 311 to the third loop 96.

The third loop 96 includes a CRC 312 associated with a valve 313, the valve 313 associated with a separation device 314 like the device 300 (although it may separate out different "rejects", and use different techniques, depending upon the characteristics of the water in loop 96). The device 314 has a contaminants discharge line 315 which connects up to the main line 316, which is also connected to the discharge line 317 from the valve 313. The "accepts" output from the separation device 314 passes to the cooler 318. The CRC 312 monitors the contamination level in the loop 96, and if it becomes greater than desired, the valve 313 is controlled to discharge some of the contaminated liquid into the line 317, which ultimately ends up in the fourth loop The fourth loop 97 includes the CRC 319 connected to three-way valve 320, the valve 320 in turn being connected to a separation device 321 like the device 300. The discharge line 322 for contaminants from the separation device 321 joins with the discharge line 323 from valve 320 to form the main line 324 which connects up to the bleach plant 212 effluent line 81. The clean output of the separation device 321 is connected to the cooler 325, and that in turn may be connected to a valve 326 or the like which may dump into the spills recovery system 239, connected by line 327 to the inlet to the valve 320.

The line 81 which contains both the bleach plant effluents as well as the most contaminated liquid (from line 324) from fourth loop 97 may be connected up to the evaporators 229, 230, 241, which preferably are metal-plastic laminate multiple stage evaporators. The evaporators 229, etc. produce a concentrated liquid effluent which is passed to an incinerator 232, or for like treatment (as described above with respect to FIGS. 4 and 5), while the clean water (liquid) therefrom passes into line 330. An optional water treatment plant 242 (shown in dotted line in FIG. 7, and comparable to the structure 242 in FIG. 4 and 42 in FIGS. 1 and 2) may be provided to treat the water in line 330 before it is returned to the bleach plant 212, or otherwise utilized.

For each of the loops 94 through 97, when contaminated liquid is removed it is, of course, necessary to replace at least a portion of the liquid, otherwise the liquid loop would become depleted. For the second loop 94 this is typically accomplished by utilizing the discharge through line 307 connected to valve 306. The valve 306—as shown schematically in FIG. 7—may be controlled by CRC 309 and/or the CRC 98, to supply supplemental water to the loop 94.

The supplemental, make-up, water supply to the first loop 95 is typically provided by line 331 which is an off shoot of line 330, containing clean water. Of course for any of the loops 94 through 97, however, all that is necessary is that the contaminated liquid discharge be replaced by less contaminated liquid, although for the seal loop 95 it is desirable to have the clean water from line 330. FIG. 7 also shows branch lines 332 and 333 supplying liquid to the loops 96, 97, respectively for make-up purposes, although the volume of make-up liquid to these lines will be fairly low since they are provided with liquid from the previous lines (i.e. loop 96 is provided with liquid from both lines 303 and 311, while loop 97 is provided with liquid from both spill containment source 239 and line 316). Since the vast majority of make-up liquid for loops 96 and 97 will be provided by the previous loop or loops, if any make-up liquid from the clean line 330 needs to be supplied through the branches 332, 333, it will be a minimal amount.

It will thus be seen that by utilizing the system as illustrated in FIG. 7, the cleanest water can be reserved for only where necessary, yet there is sufficient water flow through all of the liquid circuits within the mill.

It will thus be seen that according to the present invention an effective method and apparatus have been provided for absolutely minimizing effluents from a cellulose pulp mill. While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent methods and apparatus.

What is claimed is:

1. A method of minimizing effluents from a cellulose pulp mill having a digester, bleach plant, a chemical plant for the bleach plant for producing chlorine dioxide, and a sulfur-containing chemical recovery loop, comprising the steps of:
   (a) concentrating liquid effluents from the bleach plant to a concentration level high enough for incineration;
   (b) incinerating the concentrated bleach plant effluents to produce a residue containing sodium, sulfate, sodium chloride, and carbonate;
   (c) distilling the residue from step (b) with sulfuric acid to produce gaseous hydrogen chloride, and remaining residue;
   (d) using the gaseous hydrogen chloride from step (c) in the chemical plant for producing chlorine dioxide;
   (e) passing the remaining residue from step (c) to the sulfur-containing chemical recovery loop; wherein the recovery loop includes a recovery boiler, and wherein step (e) is practiced to pass the remaining residue to the recovery boiler.

2. A method as recited in claim 1 comprising the further steps of:
   (f) removing black liquor from association with the digester;
   (g) increasing the solids concentration of the black liquor to a level high enough for incineration;
   (h) incinerating the concentrated black liquor in the recovery boiler to produce a melt;
   (i) producing white liquor and/or substantially sulfur free NaOH from materials in the recovery loop including from the melt and the remaining residue fed to the recovery loop;
   (j) oxidizing at least a part of the white liquor; and
   (k) using at least a part of the oxidized white liquor in place of caustic in the bleach plant.

3. An method as recited in claim 1 comprising the further steps of: collecting spills of liquid from the pulp mill; concentrating the collected spills to a concentration level high enough to be incinerated; and adding the concentrated spills to the concentrated bleach plant effluents to practice step (b).

4. A method as recited in claim 1 comprising the further step of treating the remaining residue to remove heavy and transition metals prior to the practice of step (e).

5. A method as recited in claim 1 wherein the recovery loop includes evaporators connected to the recovery boiler, and wherein step (e) is practiced to pass the remaining residue first to the evaporators, and then to the recovery boiler.

6. A method as recited in claim 5 comprising the further step of treating the remaining residue to remove heavy and transition metals prior to the practice of step (e).

7. A method as recited in claim 1 wherein the mill has a non-condensible gas system, including hydrogen sulfide and methyl mercaptan gases, and comprising the further steps (f) of combusting the non-condensible gases in the non-condensible gas system to produce gaseous sulfur dioxide; (g) converting the gaseous sulfur dioxide to sulfuric acid; and (h) using the sulfuric acid from step (g) in step (c).

8. A method as recited in claim 7 comprising the further step (i), between steps (f) and (g), of reacting the gaseous sulfur dioxide from step (f) with sodium sulfite and water to produce concentrated sodium bisulfite and heating the concentrated sodium bisulfite to regenerate a concentrated form of gaseous sulfur dioxide; and wherein the concentrated form of gaseous sulfur dioxide from step (i) is used in step (g).

9. A method as recited in claim 1 wherein step (a) is practiced by evaporating the liquid effluents from the bleach plant.

10. A method as recited in claim 9 wherein step (a) is further practiced by passing the liquid effluents through a plurality of stages of metal-plastic laminate falling film evaporators.

11. A method as recited in claim 1 wherein the pulp mill also has at least first, second, and third loops of liquid streams in the pulp mill, the loops having significantly different contamination levels, the contamination level gradually increasing from the first loop to the third loop; comprising the further step of minimizing the use of least contaminated liquid by practicing the substeps of: (i) sensing the contamination level in at least the first and second loops; (ii) when the contamination level in the first loop exceeds a predetermined level, discharging some of the contaminated liquid from the first loop to the second loop, and replacing it with less contaminated liquid; (iii) when the contamination level in the second loop exceeds a predetermined level, discharging some of the contaminated liquid from the second loop to the third loop, and replacing it with less contaminated liquid; and (iv) purifying the most contaminated liquid from the loops to produce the less contaminated liquid for addition to at least substep (ii).

12. A method as recited in claim 1 comprising the further steps of: collecting spills of liquid from the pulp mill; concentrating the collected spills to a concentration level high enough to be incinerated; and adding the concentrated spills to the concentrated bleach plant effluents to practice step (b).

13. A method as recited in claim 1 comprising the further step of treating the remaining residue to remove heavy and transition metals prior to the practice of step (e).

14. A method as recited in claim 1 wherein the recovery loop includes evaporators connected to the recovery boiler, and wherein step (e) is practiced to pass the remaining residue first to the evaporators, and then to the recovery boiler; and comprising the further step of treating the remaining residue to remove heavy and transition metals prior to the practice of step (e).

15. A method of minimizing effluents from a cellulose pulp mill having a digester from which black liquor is withdrawn, a non-chlorine bleach plant, and a sulfur-containing chemical recovery loop, including a recovery boiler, distinct from the non-chlorine bleach plant, the method comprising the steps of:

(a) concentrating, entirely distinct from the recovery loop and the black liquor withdrawn from the digester, liquid effluents from the non-chlorine bleach plant, having little or no chlorine therein, to a concentration level high enough for combustion in the recovery boiler;

(b) passing the concentrated non-chlorine bleach plant effluents directly to the recovery boiler;

(c) combusting the concentrated non-chlorine bleach plant effluents in the recovery boiler, wherein the pulp mill also has at least first, second, and third loops of liquid streams in the pulp mill, the loops having significantly different contamination levels, the contamination level gradually increasing from the first loop to the third loop; comprising the further step of minimizing the use of least contaminated liquid by practicing the substeps of: (i) sensing the contamination level in at least the first and second loops; (ii) when the contamination level in the first loop exceeds a predetermined level, discharging some of the contaminated liquid from the first loop to the second loop, and replacing it with less contaminated liquid; (iii) when the contamination level in the second loop exceeds a predetermined level, discharging some of the contaminated liquid from the second loop to the third loop, and replacing it with less contaminated liquid; and (iv) purifying the most contaminated liquid from the loops to produce the less contaminated liquid for addition to at least substep (ii).

16. A method as recited in claim 15 wherein step (a) is practiced by evaporating the liquid effluents from the non-chlorine bleach plant.

17. A method as recited in claim 16 wherein step (a) is further practiced by passing the liquid effluents from the non-chlorine bleach plant through a plurality of stages of metal-plastic laminate falling film evaporators.

* * * * *